(12) United States Patent
Rezk et al.

(10) Patent No.: US 11,486,986 B2
(45) Date of Patent: Nov. 1, 2022

(54) LIDAR SYSTEM WITH SOLID STATE SPECTRAL SCANNING

(71) Applicant: Aeva, Inc., Mountain View, CA (US)

(72) Inventors: Mina Rezk, Haymarket, VA (US);
Omer P. Kocaoglu, Fremont, CA (US);
Oguzhan Avci, Cupertino, CA (US);
Neal N. Oza, Palo Alto, CA (US);
Keith Gagne, Santa Clara, CA (US);
Behsan Behzadi, Sunnyvale, CA (US)

(73) Assignee: Aeva, Inc., Mountain View, CA (US)

( * ) Notice: Subject to any disclaimer, the term of this patent is extended or adjusted under 35 U.S.C. 154(b) by 768 days.

(21) Appl. No.: 16/449,189

(22) Filed: Jun. 21, 2019

(65) Prior Publication Data
US 2020/0400798 A1 Dec. 24, 2020

(51) Int. Cl.
| G01C 3/08 | (2006.01) |
| G01S 7/4911 | (2020.01) |
| G01S 7/481 | (2006.01) |
| G01S 17/08 | (2006.01) |

(52) U.S. Cl.
CPC ........... *G01S 7/4911* (2013.01); *G01S 7/4814* (2013.01); *G01S 7/4817* (2013.01); *G01S 17/08* (2013.01)

(58) Field of Classification Search
CPC .... G01S 7/4911; G01S 7/4814; G01S 7/4817; G01S 17/08; G01S 7/4816; G01S 17/42; G01S 17/89
USPC ....................................................... 356/5.11
See application file for complete search history.

(56) References Cited

U.S. PATENT DOCUMENTS

| 4,184,767 A | 1/1980 | Hughes et al. | |
| 2010/0277796 A1* | 11/2010 | Magarill | G02B 27/102 359/485.02 |
| 2011/0063728 A1* | 3/2011 | Cai | G02B 27/283 359/484.09 |
| 2014/0269790 A1* | 9/2014 | Sebastian | G01J 9/02 372/20 |
| 2014/0355933 A1* | 12/2014 | Yuan | G02B 6/3518 385/18 |
| 2017/0090031 A1 | 3/2017 | Bondy et al. | |
| 2018/0306925 A1* | 10/2018 | Hosseini | G01S 17/42 |

OTHER PUBLICATIONS

International Search Report and Written Opinion of the ISA/EP in PCT/US2020/036002 dated Sep. 18, 2020; 11 pages.

\* cited by examiner

Primary Examiner — Md M Rahman
(74) Attorney, Agent, or Firm — Womble Bond Dickinson (US) LLP

(57) ABSTRACT

A light detection and ranging (LIDAR) apparatus is provided that includes an optical source to emit a first optical beam having a first frequency and a second optical beam having a second frequency and a dispersive element to deflect the first optical beam having the first frequency at a first angle and the second optical beam having the second frequency at a second angle.

18 Claims, 9 Drawing Sheets

900

```
┌─────────────────────────────────────────────────────────┐
│ Generate, by an optical source, a first optical beam    │
│ having a first frequency                                 │
│                                                      902 │
└─────────────────────────────────────────────────────────┘
                            │
                            ▼
┌─────────────────────────────────────────────────────────┐
│ Generate, by the optical source, a second optical beam  │
│ having a second frequency                                │
│                                                      904 │
└─────────────────────────────────────────────────────────┘
                            │
                            ▼
┌─────────────────────────────────────────────────────────┐
│ Generate a first local oscillator signal using the first │
│ optical beam and a second local oscillator signal using  │
│ the second optical beam                              906 │
└─────────────────────────────────────────────────────────┘
                            │
                            ▼
┌─────────────────────────────────────────────────────────┐
│ Providing, to a dispersive element, the first optical   │
│ beam having the first frequency and the second optical  │
│ beam having the second frequency to deflect the first   │
│ optical beam at a first angle and the second optical    │
│ beam at a second angle                              908  │
└─────────────────────────────────────────────────────────┘
                            │
                            ▼
┌─────────────────────────────────────────────────────────┐
│ Receive a first target signal associated with the first │
│ optical beam and a second target signal associated with │
│ the second optical beam                              910 │
└─────────────────────────────────────────────────────────┘
                            │
                            ▼
┌─────────────────────────────────────────────────────────┐
│ Combine the first target signal with the first local    │
│ oscillator signal to generate a first combined signal   │
│ and the second target signal with the second local      │
│ oscillator signal to generate a second combined signal  │
│                                                      912 │
└─────────────────────────────────────────────────────────┘
                            │
                            ▼
┌─────────────────────────────────────────────────────────┐
│ Provide the first combined signal and the second        │
│ combined signal to a photodetector                       │
│                                                      914 │
└─────────────────────────────────────────────────────────┘
```

FIG. 9

LIDAR SYSTEM WITH SOLID STATE SPECTRAL SCANNING

TECHNICAL FIELD

The present disclosure relates generally to light detection and ranging (LIDAR) that provides simultaneous measurement of range and velocity across two dimensions.

BACKGROUND

Fast-scanning mirrors are the primary components used to illuminate a scene in most conventional LIDAR systems. One mirror typically scans quickly along the X direction (azimuth), while another mirror scans slowly along the Y direction (elevation). Light emission and detection from target reflections are done coaxially, typically via a single-mode fiber. The collected light has a measured delay or an altered frequency signature that is used to extract range, and potentially velocity, information. A 3D point cloud can be established when the point-wise detected range information is combined with angular position feedback from the scanning mirrors.

To achieve higher frame rates, the mirror's angular velocity is increased, especially that of the scanner in faster scan direction (X scanner in our case). When using the mirrors with a high angular velocity and single-mode fiber-based detection, the target signal from distant objects is severely degraded. Signal degradation is mainly due to the difference in angular position of the scanner mirror from the launch time of the optical signal (pulsed or frequency swept) to the collection time of the same signal from a distant scattering target. This slight angular change causes a walk-off of the target signal at the fiber tip decreasing the coupling efficiency, which manifests itself as a weaker signal detection. Such degradation becomes more severe as the fiber diameter decreases, e.g. a single-mode fiber with ~10-μm diameter, or as the mirrors' angular velocity increases.

SUMMARY

The present disclosure includes, without limitation, the following example implementations.

Some example implementations provide a light detection and ranging (LIDAR) apparatus including an optical source to emit a first optical beam having a first frequency and a second optical beam having a second frequency and a dispersive element to deflect the first optical beam having the first frequency at a first angle and the second optical beam having the second frequency at a second angle.

Some example implementations provide a method including generating, by an optical source of a light detection and ranging (LIDAR) system, a first optical beam having a first frequency and a second optical beam having a second frequency. The method may further include providing, to a dispersive element, the first optical beam having the first frequency and the second optical beam having the second frequency, wherein the dispersive element deflects the first optical beam having the first frequency at a first angle and the second optical beam having the second frequency at a second angle.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

FIG. 9 depicts a flow diagram of a method for solid state spectral scanning with a LIDAR system in accordance with implementations of the present disclosure.

DETAILED DESCRIPTION

Figure 1:
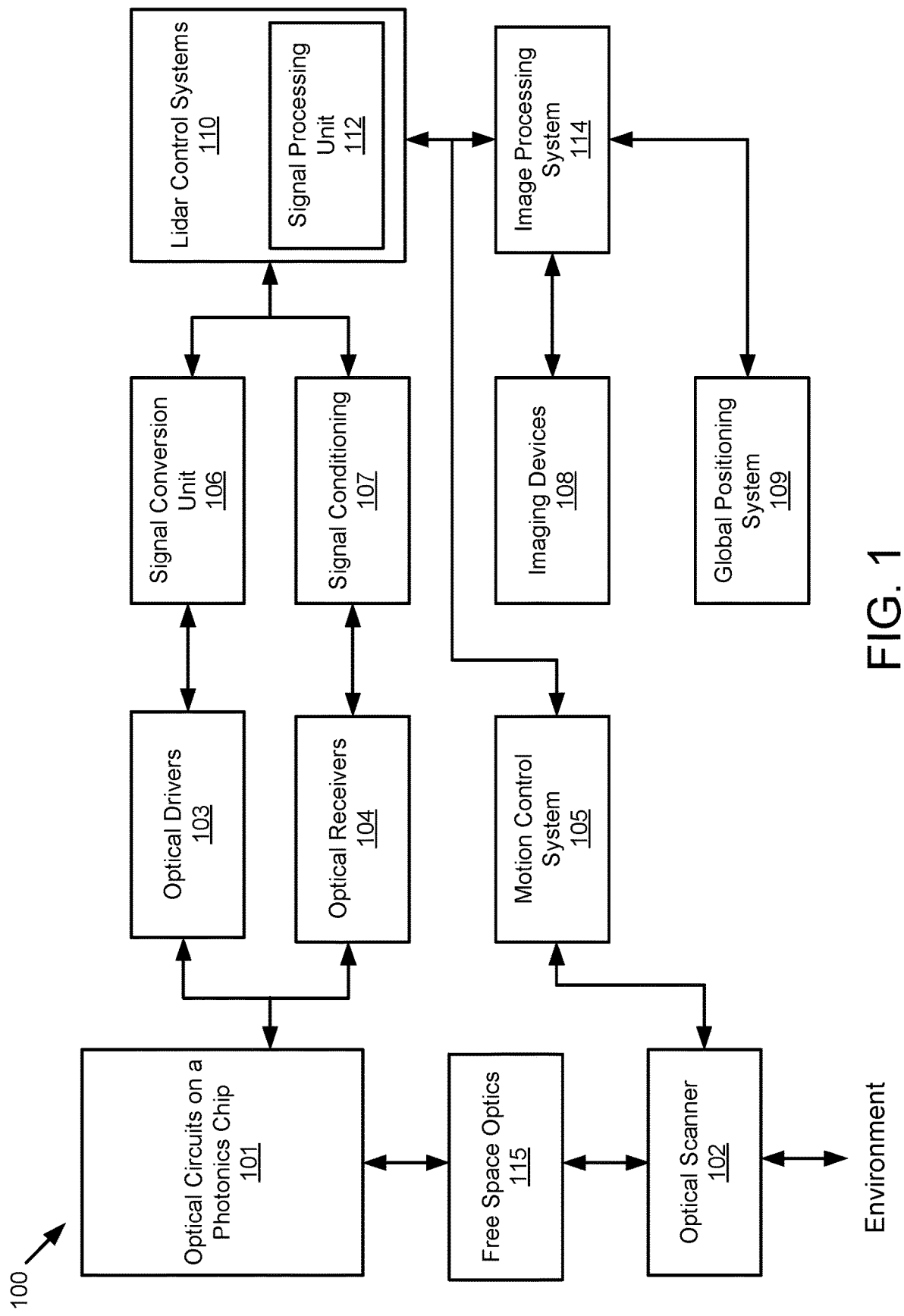
FIG. 1 illustrates a LIDAR system according to example implementations of the present disclosure.

Example implementations of the present disclosure are directed to an improved scanning LIDAR system. Example implementations of the present disclosure are based on a type of LIDAR that uses frequency modulation (FM) and coherent detection to overcome the shortcomings of traditional LIDAR systems and the limitations of prior FM LIDAR systems. Historically, FM LIDAR systems suffer from significant losses in the beam's return path; thus, such systems, which are often quite bulky, require a higher average beam output power to measure distances comparable to time-of-flight (TOF) LIDAR systems. However, the range is limited by the operating distance for eye-safe output powers.

Example implementations of the present disclosure are configured to simultaneously measure the range and velocity, using coherent detection and having the added benefit of immunity to crosstalk from other LIDAR systems. Other implementations may be used with incoherent systems to improve, range, frame rate, or detection. Example implementations minimize optical losses in the beam's return path, thereby increasing the system's measurement range. Additionally, by using nondegenerate optical sources, example implementations can leverage mature wavelength division multiplexing (WDM) techniques often used in integrated silicon photonics, a desired platform due to its compactness and relative stability in varying environmental conditions.

A conventional frequency-modulated continuous-wave (FMCW) LIDAR system relies on scanning a laser beam or multiple laser beams over a desired field of view (FOV) to map target space in three dimensions (3D) and in time. The angular scanning of the laser beam(s) uses moving mechanical components, such as galvanometer-based scanners. Galvanometer-based scanners, as well as other mechanically-based scanners, typically contain many moving parts that are prone to failure. Furthermore, due to the complexity of mechanically-based scanners, the price of such scanners is relatively high, resulting in difficulties in mass manufacturing of conventional FMCW LIDAR systems.

Example implementations of the present disclosure address the above and other deficiencies by performing spectral scanning using an FMCW LIDAR system including a dispersive element. In embodiments, the system can also use a diffraction grating or some other refraction-based optic, but for simplicity, the term "dispersive" may be used to encompass the idea that the operating element changes the scan angle due to a change in the source wavelength. Embodiments of the disclosure utilize wavelength/frequency-based steering of an optical beam generated by one or more optical sources of the FMCW LIDAR system. The optical source of the FMCW LIDAR system may generate optical beams having different frequencies over a bandwidth that corresponds to a FOV. For example, the optical source may generate multiple linear chirps that are each tuned around a different frequency. The optical beams having different frequencies are provided to a dispersive element. The dispersive element is a passive component of the FMCW LIDAR system made of a material that deflects the optical beams at different angles based on the frequency of the optical beam. For example, multiple linear chirps may be provided to the dispersive element at different frequencies such that the deflected angles of the chirps cover a desired FOV.

Accordingly, by performing spectral scanning using an FMCW LIDAR system that includes a dispersive element, optical beams can be transmitted over a desired FOV without the use of a mechanical-based scanner. Because the dispersive element is a passive component that does not contain moving parts, the chance of failure compared to a mechanical-based scanner is significantly reduced, improving the performance of the FMCW LIDAR system. Furthermore, the cost of a dispersive element is relatively low compared to a mechanical-based scanner, improving the manufacturability of the FMCW LIDAR system.

Although embodiments of the disclosure are described using a FMCW LIDAR system, aspects of the disclosure may be utilized by any sensing market including, but not limited to, transportation, manufacturing, metrology, medical and security markets. Furthermore, aspects of the disclosure may be applied to any type of LIDAR system. For example, aspects of the disclosure may be applied to a TOF LIDAR system.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101 implemented on a photonics chip. The optical circuits 101 may include a combination of active optical components and passive optical components. Active optical components may generate, amplify, or detect optical signals and the like. In some examples, the active optical circuit includes optical beams at different wavelengths, one or more optical amplifiers, one or more optical detectors, or the like.

Free-space optics 115 may include one or more lens elements to couple light in or out of optical waveguides to carry optical signals, and route and manipulate optical signals to appropriate input/output ports of the active optical circuit. The free-space optics 115 may also include one or more optical components such as taps, wavelength division multiplexers, splitters/combiners, polarization beam splitters, collimators, couplers or the like. In some embodiments, as discussed further below, the free-space optics 115 may include components to transform the polarization state and direct received polarized light to optical detectors using a polarization beam splitter (PBS). The free-space optics 115 further include a dispersive element to deflect optical beams having different frequencies at different angles along an axis (e.g., a fast-axis), as will be described in further detail below.

In embodiments, the LIDAR system 100 includes an optical scanner 102 that includes one or more scanning mirrors that are rotatable along an axis (e.g., a slow-axis) that is orthogonal or substantially orthogonal to the fast-axis of the dispersive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes a LIDAR control systems 110. The LIDAR control systems 110 may include a processing device for the LIDAR system 100. In embodiments, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LIDAR control systems 110 may include a signal processing unit 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some embodiments, the signals from the optical receivers 104 may be subject to signal conditioning 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment. In some example implementations, the system points multiple modulated optical beams to the same target.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a programmed pattern defined by the motion control subsystem. The optical circuits may also include a polarization wave plate to transform the polarization of the light as it leaves the optical circuits 101. In embodiments, the polarization wave plate may be a quarter-wave plate or a half-wave plate. A portion of the polarized light may also be reflected back to the optical circuits 101. For example lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104. Configuration of optical circuits 101 for polarizing and directing beams to the optical receivers 104 are described further below.

The analog signals from the optical receivers 104 are converted to digital signals using analog to digital converters (ADCs). The digital signals are then sent to the LIDAR control systems 110. A signal processing unit 112 may then receive the digital signals and interpret them. In some embodiments, the signal processing unit 112 also receives position data from the motion control system 105 as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
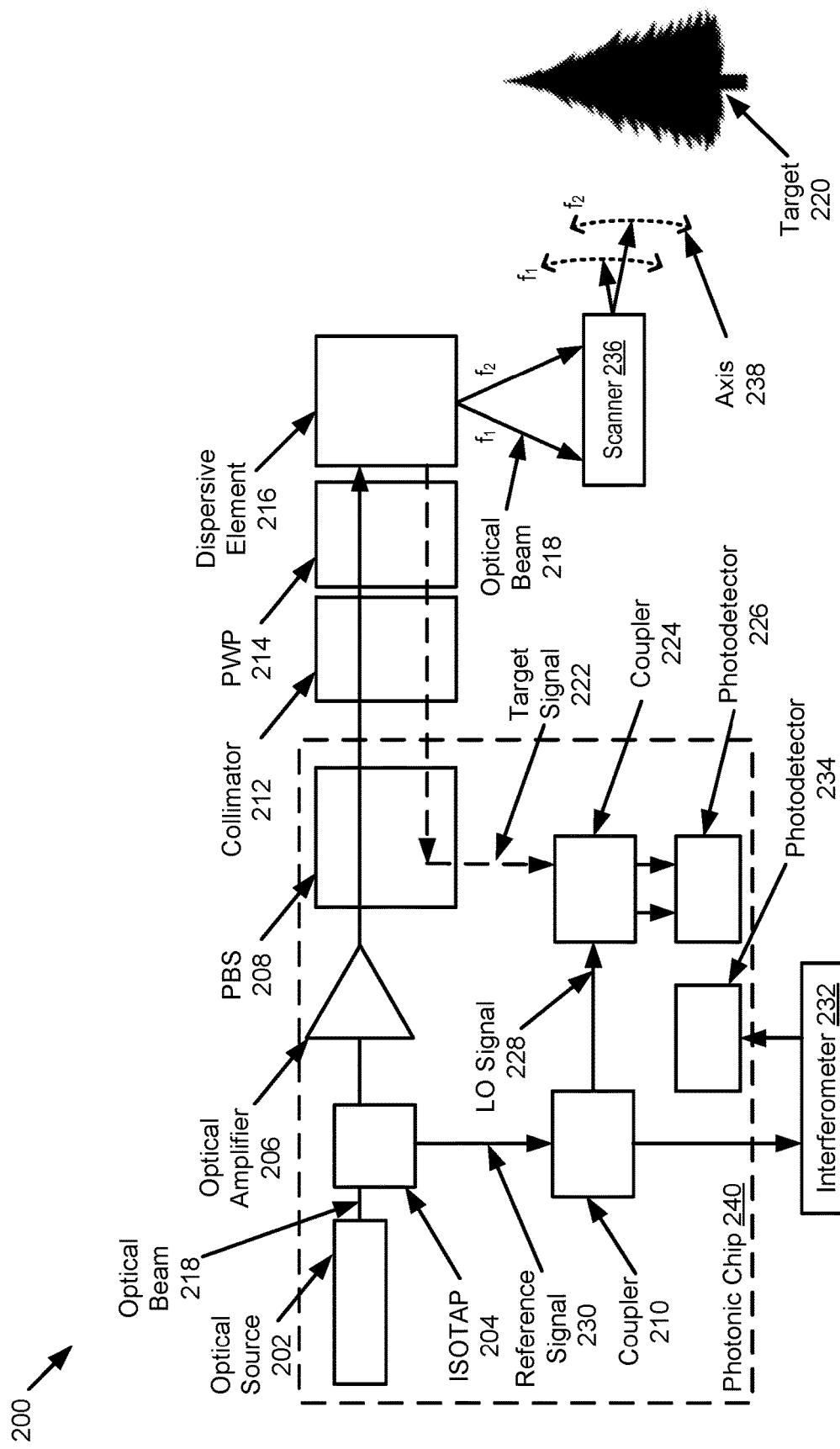
FIG. 2 illustrates aspects of a LIDAR system in accordance with embodiments of the present disclosure.

FIG. 2 illustrates aspects of a LIDAR system 200 in accordance with embodiments of the present disclosure. In embodiments, one or more components of LIDAR system 200 may be implemented in a photonic chip 240. As shown, an optical source 202 generates an optical beam 218. In some embodiments, multiple optical sources may be used to generate multiple optical beams. In embodiments, the multiple optical beams may have different wavelengths/frequencies from one another. For example, a first optical source may generate a first optical beam having a first frequency and a second optical source may generate a second optical beam having a second frequency that is different than the first frequency. The optical beam 218 is provided to an optical isolator including a tap (e.g., ISOTAP 204) that is operatively coupled to the optical source 202. The ISOTAP 204 allows the transmission of the optical beam 218 in one direction, preventing optical feedback. The tap of ISOTAP 204 splits a portion of optical beam 218 as a reference signal 230. The reference signal 230 may be provided to a coupler 210 of a reference arm circuit. The coupler 210 receives the reference signal 230 and splits a portion of the reference signal 230 to produce a local oscillator (LO) signal 228. In embodiments, the coupler 210 may be a balanced (50/50) or an unbalanced coupler. The reference signal 230 may be provided to an interferometer 232 of the reference arm circuit that is operatively coupled to the coupler 210. In embodiments, the interferometer 232 may be a Mach-Zehnder Interferometer (MZI) that is used to determine the relative phase shift variations between optical beams that are derived from splitting the reference signal 230. The interferometer 232 may then provide the reference signal 230 to photodetector 234 of the reference arm circuit for subsequent analysis.

The optical beam 218 is provided to an optical amplifier 206 that is operatively coupled to the ISOTAP 204. The optical amplifier 206 amplifies light signals of the optical beam 218. The LIDAR system 200 may further include at least one optical device to route the optical beam 218 towards collimator 212 and route the target signal 222 to the photodetector 226. As shown, the optical device(s) include a polarization beam splitter (PBS) 208 and a polarization wave plate (PWP) 214. Other examples of suitable optical device(s) may include an optical circulator or an optical splitter/combiner.

The optical beam 218 may pass through a polarization beam splitter (PBS) 208 that is operatively coupled to the optical amplifier 206.

The optical beam 218 may be provided to a collimator 212 to focus/collimate the optical beam 218. The optical beam 218 may be provided to a polarization wave plate (PWP) 214 that transforms the polarization of the optical beam 218. For example, the polarization of the optical beam 218 may be transformed to a circular polarization. In some embodiments, an optical circulator may be utilized to redirect the optical beam 218 rather than a PWP and/or PBS.

Upon transforming the polarization of the light, the optical beam 218 may be provided to a dispersive element 216. The dispersive element 216 may be composed of a material that deflects optical beams at different angles based on the frequency of the optical beam. For example, the dispersive element 216 may deflect an optical beam 218 having a first frequency (e.g., $f_1$) at a first angle and an optical beam having a second frequency (e.g., $f_2$) at a second angle. In embodiments, the dispersive element 216 may deflect optical beams at angles along an axis that corresponds to the fast-scan direction of the LIDAR system 200. For example, the dispersive element 216 may deflect optical beams along a horizontal or substantially horizontal axis.

In some embodiments, the optical beam 218 that has been deflected by dispersive element 216 may be transmitted towards a target 220 via a scanner 236 (e.g., optical scanner 102 of FIG. 1). In other embodiments, LIDAR system 200 may not include scanner 236 and optical beams 218 may be transmitted towards target 220 via the dispersive element 216. The scanner 236 may deflect the optical beam 218 along axis 238 that corresponds to the slow-scan direction that is orthogonal or substantially orthogonal to the fast-scan direction of the LIDAR system 200 to generate a 3D mapping. For example, if the fast-scan direction of LIDAR system 200 is along the horizontal axis, scanner 236 may deflect the optical beam 218 along a vertical axis. When the optical beam 218 hits the target 220, a portion of the beam is returned back to the LIDAR system 200 as a target signal 222. The target signal 222 passes through the scanner 236, dispersive element 216, PWP 214 and collimator 212.

The target signal 222 is received by PBS 208. Because the polarization of the target signal 222 is transformed by PWP 214, the target signal 222 is reflected by PBS 208 rather than passing through PBS 208. The target signal 222 is reflected by PBS 208 towards a coupler 224. The coupler 224 receives the target signal 222 and the local oscillator signal 228 and produces a combined signal that includes both the target signal 222 and the local oscillator signal 228. In embodiments, the coupler 224 may be a balanced (50/50) or an unbalanced coupler. The combined signal is then received by a photodetector 226 for subsequent analysis, as previously described.

In some embodiments, the local oscillator signal 228 and the target signal 222 may be provided to the photodetector 226 without the use of coupler 224 if the local oscillator signal 228 and the target signal 222 are spatially overlapped. For example, LIDAR system 200 may not include coupler 224, in which case the local oscillator signal 228 and target signal 222 may optically mix at photodetector 226.

Figure 3:
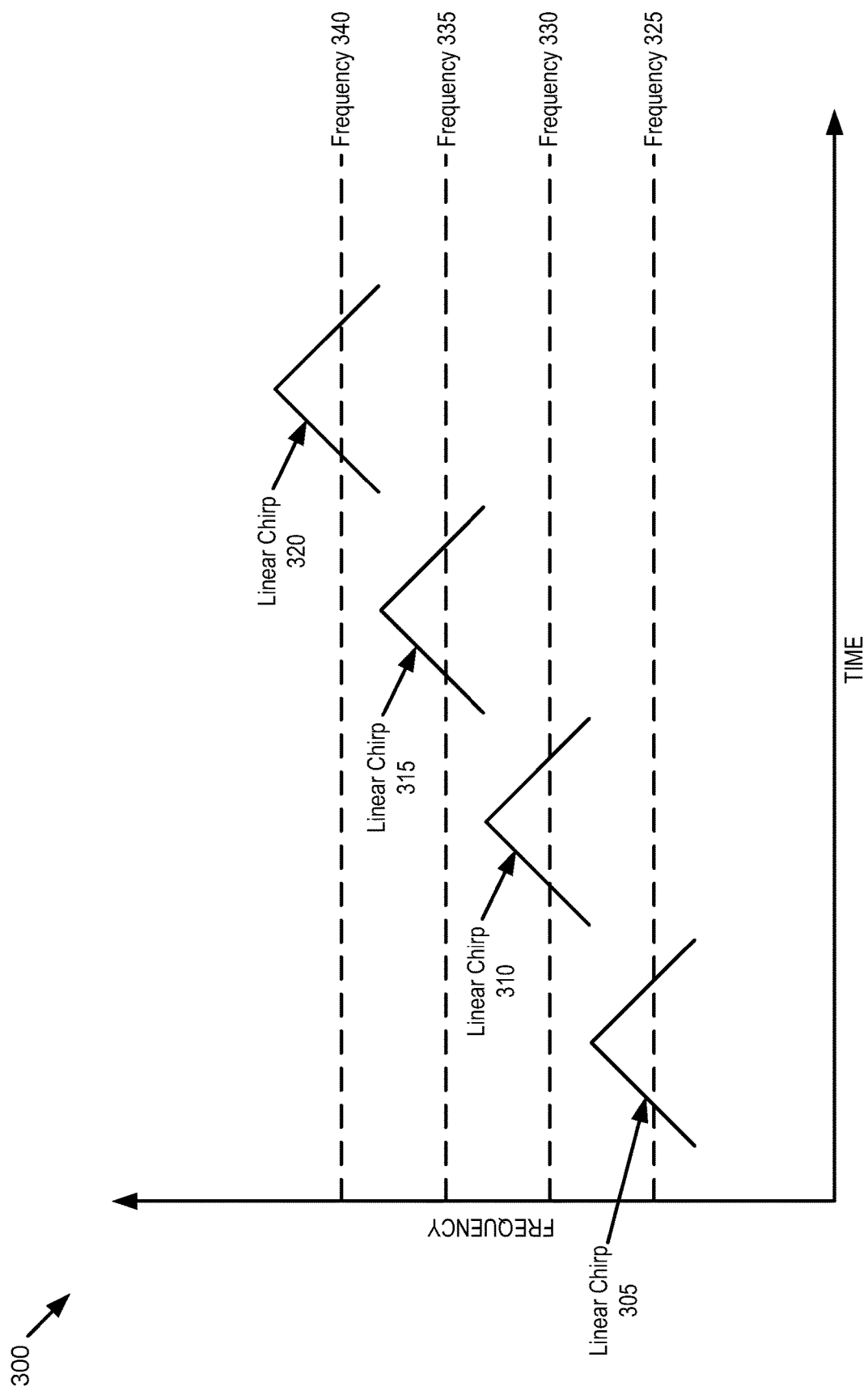
FIG. 3 is an illustration of an example of multiple linear chirps generated by a LIDAR system that are tuned around different frequencies in accordance with embodiments of the disclosure.

FIG. 3 is an illustration 300 of an example of multiple linear chirps generated by a LIDAR system that are tuned around different frequencies in accordance with embodiments of the disclosure. The illustration 300 is a graphical representation of frequency (Y-axis) of an optical beam versus time (X-axis). The optical beams, such as optical beam 218 of FIG. 2, generated by an optical source may be linear chirps tuned around different frequencies. Each linear chirp (e.g., linear chirps 305, 310, 315 and 320) may include a portion of time where the frequency of the chirp is increased at a linear or substantially linear rate and a portion of time where the frequency of the chirp is decreased at a linear or substantially linear rate.

Linear chirps 305, 310, 315 and 320 may be tuned around frequencies 325, 330, 335 and 340, respectively. The frequencies 325, 330, 335 and 340 may correspond to different angles of deflection by a dispersive element of the LIDAR system. For example, frequencies 325, 330, 335 and 340 may correspond to angles of deflection by a dispersive element that cover a desired FOV of the LIDAR system.

Figure 4:
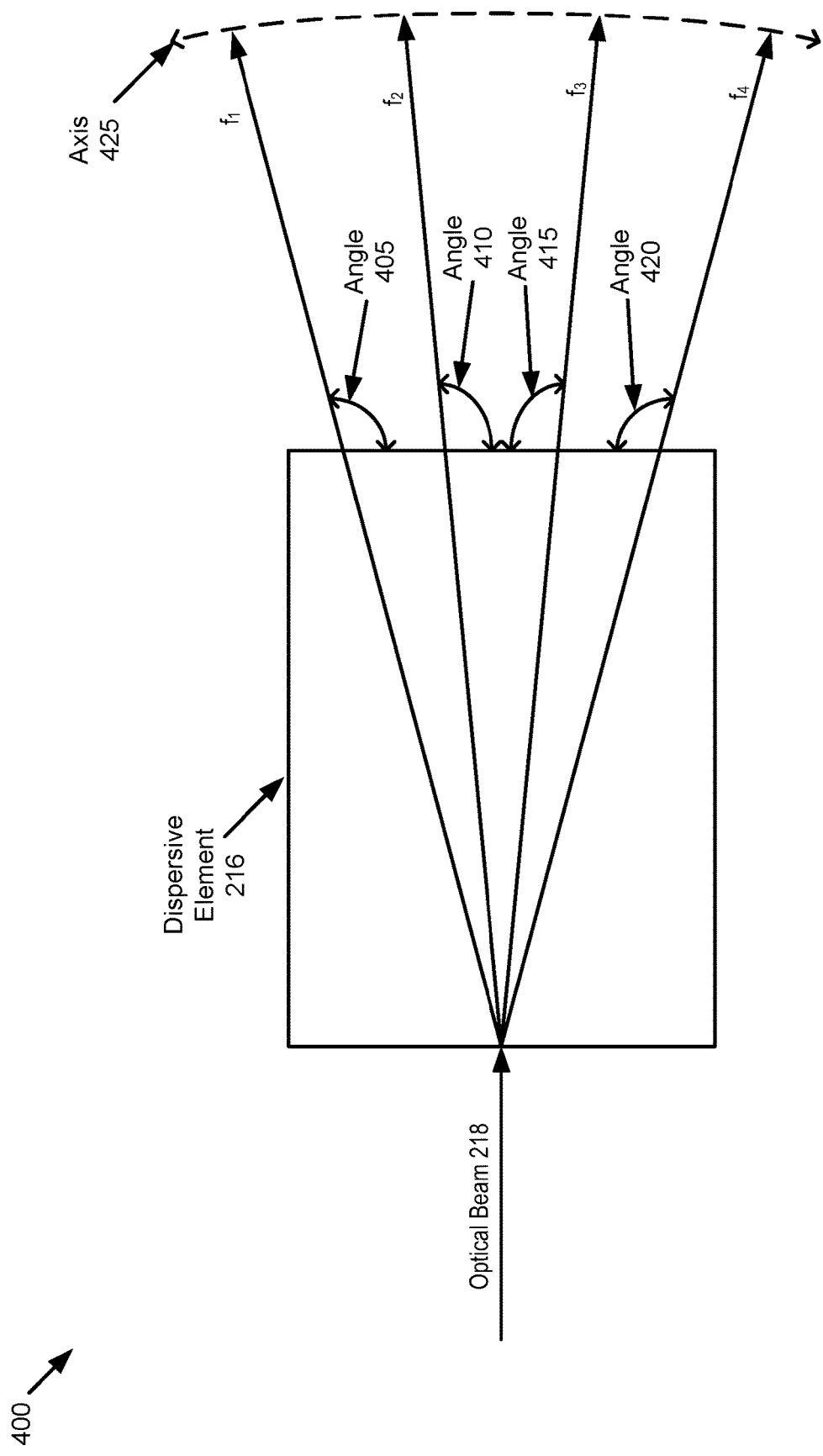
FIG. 4 is an illustration of an example of a dispersive element of a LIDAR system deflecting optical beams at different angles based on a frequency of the optical beam, in accordance with embodiments of the disclosure.

FIG. 4 is an illustration 400 of an example of a dispersive element of a LIDAR system deflecting optical beams at different angles based on a frequency of the optical beam, in accordance with embodiments of the disclosure. In illustration 400, an optical beam 218 is provided to a dispersive element 216. The dispersive element 216 deflects the optical beam 218 at different angles based on the frequency of the optical beam 218, as previously described.

FIG. 4 illustrates a series of four optical beams generated by an optical source having different frequencies (e.g., $f_1$, $f_2$, $f_3$ and $f_4$). The dispersive element 216 may deflect an optical beam 218 having frequency $f_1$ at angle 405, an optical beam 218 having frequency $f_2$ at angle 410, an optical beam 218 having frequency $f_3$ at angle 415 and an optical beam having frequency $f_4$ at angle 420. The dispersive element 216 may deflect the series of optical beams at angles 405, 410, 415 and 420 along an axis 425 that corresponds to the fast-scan direction of the LIDAR system, as previously described.

Figure 5:
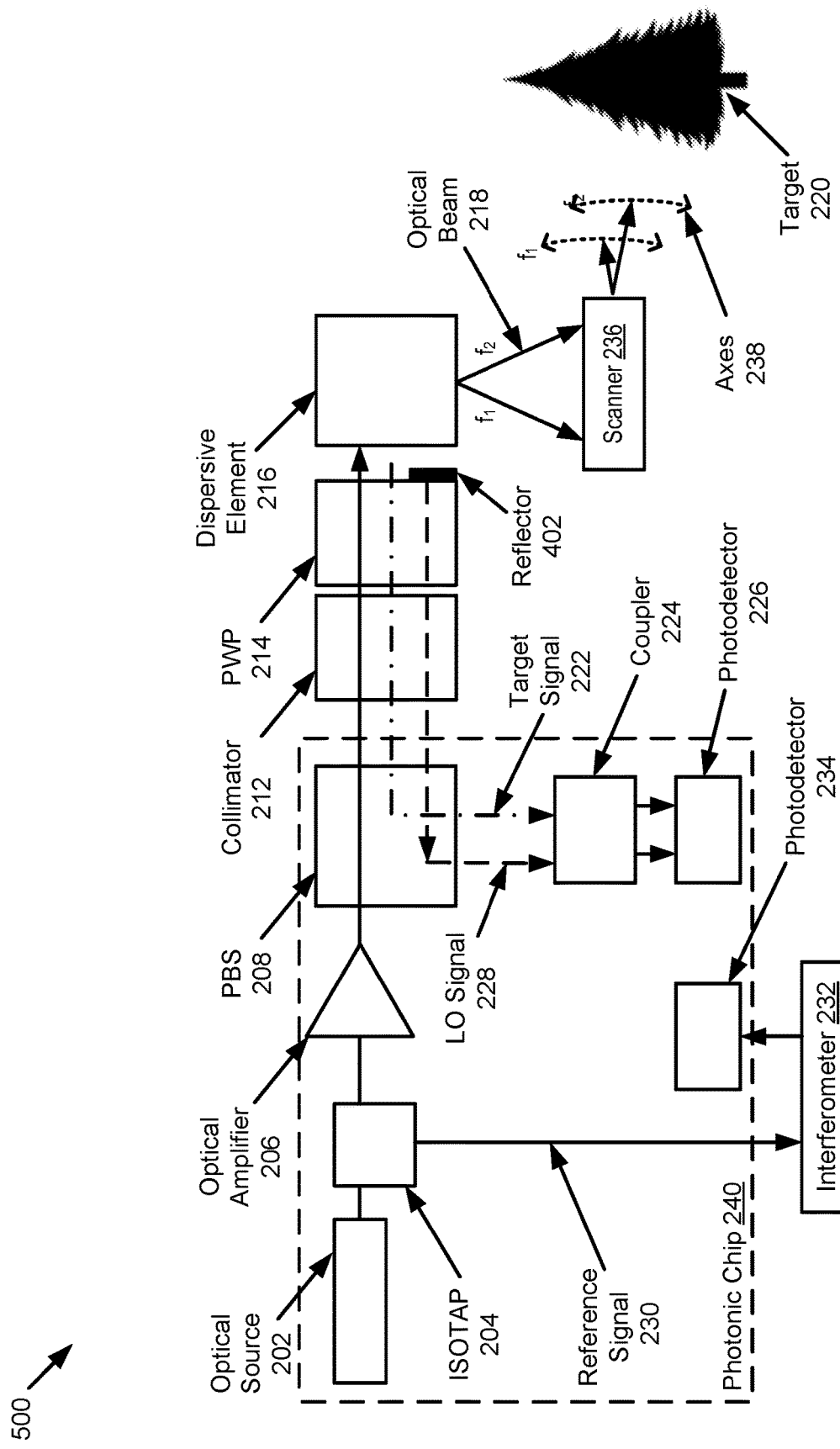
FIG. 5 illustrates aspects of a LIDAR system in accordance with other embodiments of the present disclosure.

FIG. 5 illustrates aspects of a LIDAR system 500 in accordance with other embodiments of the present disclosure. The components of LIDAR system 500 may be similar to the components of LIDAR system 200. However, rather than utilizing a coupler (e.g., coupler 210) to split a portion of reference signal 230 to produce a local oscillator signal 228, the local oscillator signal 228 may be reproduced by a reflector 402 after PWP 214. For example, reflector 402 may reflect a portion of the optical beam 218 in a direction towards optical source 202. In some embodiments, a separate mirror, retro-reflector, micro-lens array, filter or reflective coating on PWP 214 may be used. The reflected portion of the optical beam 218 becomes the local oscillator signal 228 for interference with the returned target signal 222.

Similar to the target signal 222 in FIG. 2, because the polarization of the local oscillator signal 228 has been transformed, PBS 208 reflects the local oscillator signal 228 in a direction towards coupler 224 rather than allowing the local oscillator signal 228 to pass through PBS 208. In some embodiments, LIDAR system 500 may not include coupler 224 and the local oscillator signal 228 and the target signal 222 may optically mix at photodetector 226, as previously described.

Figure 6:
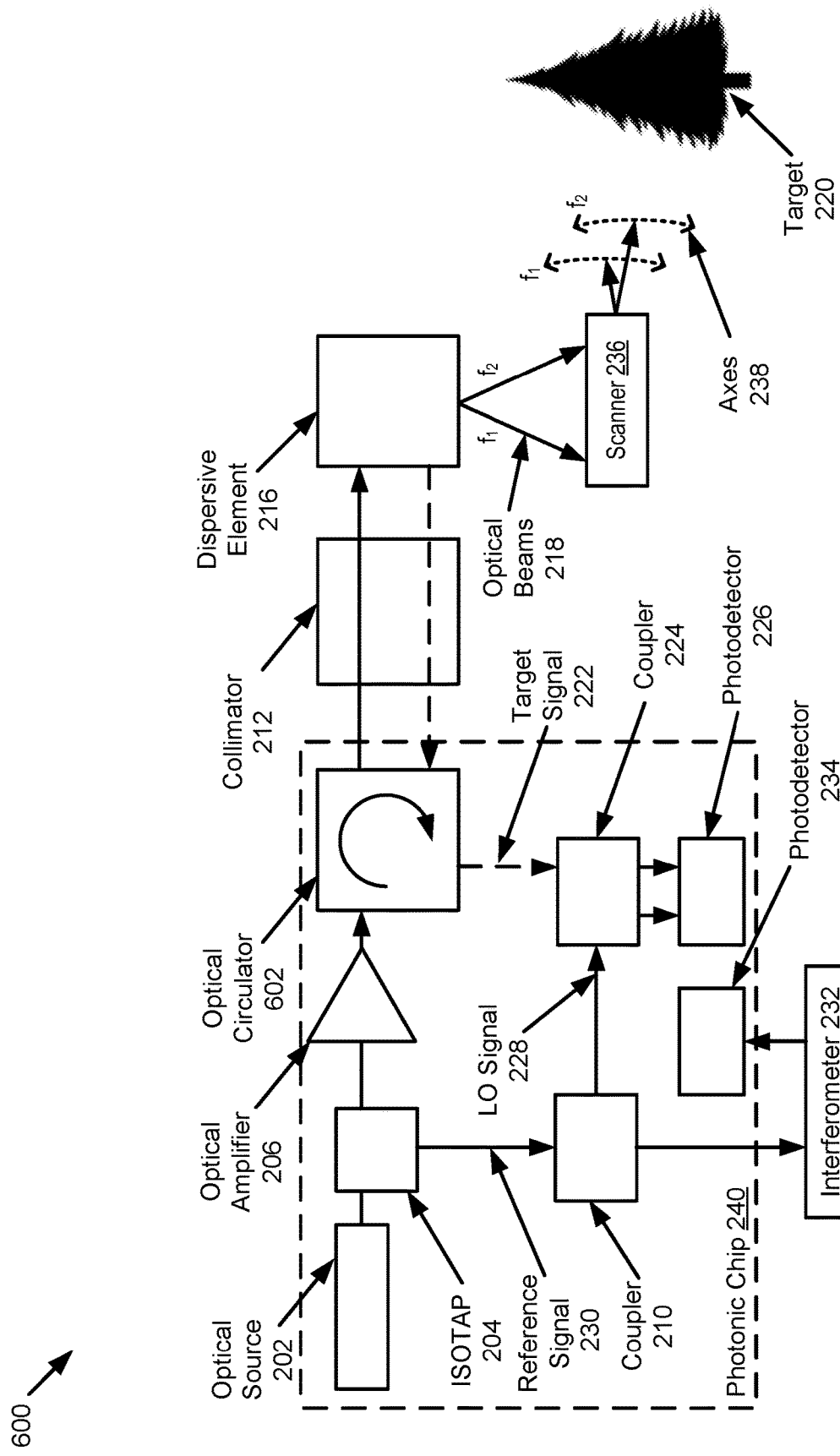
FIG. 6 illustrates aspects of a LIDAR system in accordance with some embodiments of the present disclosure.

FIG. 6 illustrates aspects of a LIDAR system 600 in accordance with some embodiments of the present disclosure. The components of LIDAR system 600 may be similar to the components of LIDAR system 200. However, rather than utilizing a PBS (e.g., PBS 208) to direct the optical beam 218 and target signal 222, LIDAR system 600 utilizes an optical circulator 602 to direct the optical beam 218 to collimator 212 and to direct the target signal to the coupler 224. In some embodiments, LIDAR system 600 may not include coupler 224 and the local oscillator signal 228 and the target signal 222 may optically mix at photodetector 226, as previously described. Furthermore, because LIDAR system 600 does not utilize a PBS, the polarization of the optical beam 218 does not need to be transformed. Accordingly, LIDAR system 600 may not include a PWP (e.g., PWP 214).

Figure 7:
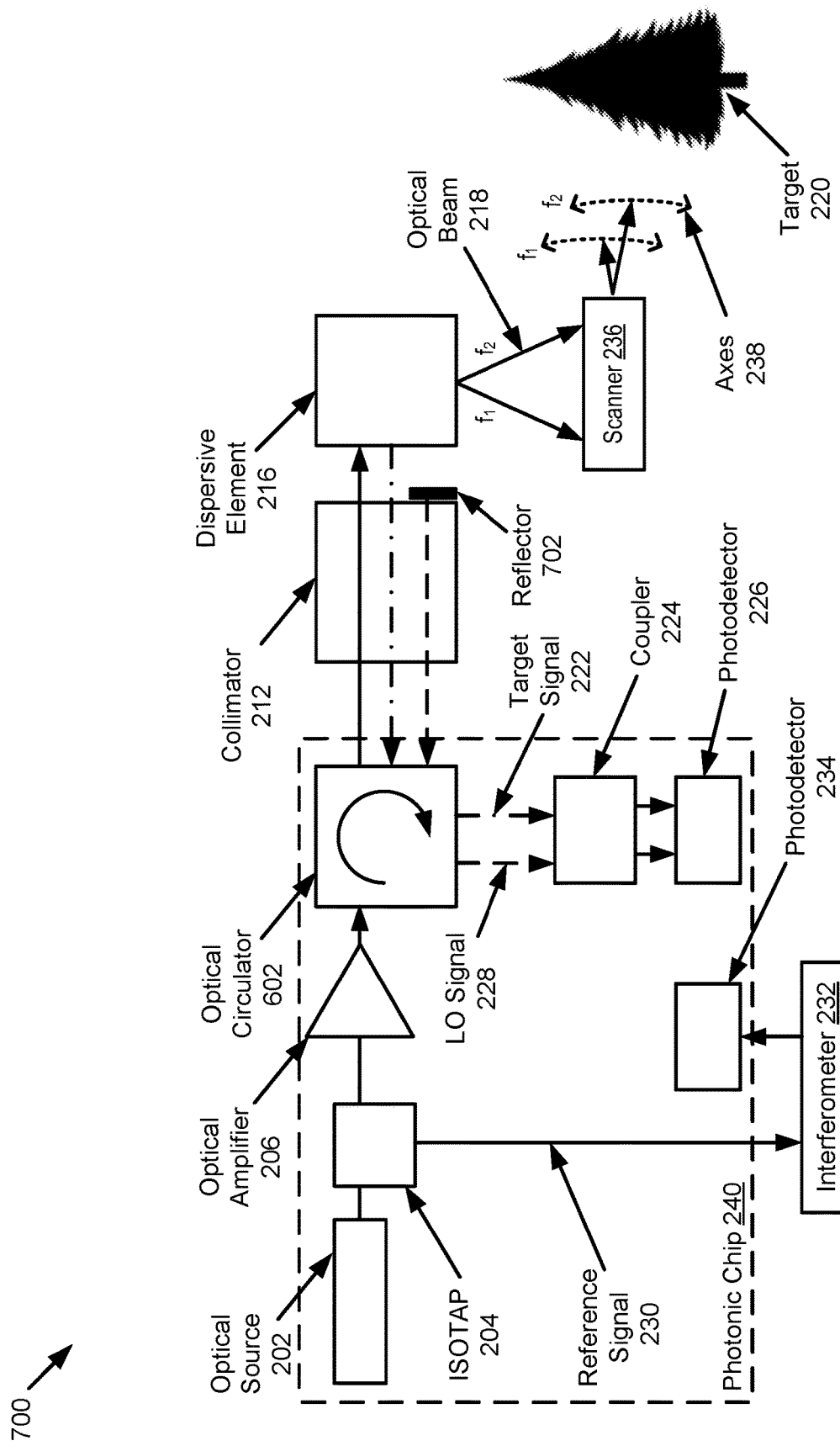
FIG. 7 illustrates aspects of a LIDAR system in accordance with an embodiment of the present disclosure.

FIG. 7 illustrates aspects of a LIDAR system 700 in accordance with some embodiments of the present disclosure. The components of LIDAR system 700 may be similar to the components of LIDAR system 600. However, rather than utilizing a coupler (e.g., coupler 210) to split a portion of reference signal 230 to produce a local oscillator signal 228, the local oscillator signal 228 may be produced by a reflector 702 of collimator 212. For example, reflector 702 may reflect a portion of the optical beam 218 in a direction towards optical source 202. In some embodiments, a separate mirror, retro-reflector, micro-lens array, filter or reflective coating on collimator 212 may be used. The reflected portion of the optical beam 218 becomes the local oscillator signal 228 for interference with the returned target signal 222.

Similar to the target signal 222 in FIG. 6, the optical circulator 602 may receive the local oscillator signal 228 and direct the local oscillator signal 228 to the coupler 224. In some embodiments, LIDAR system 700 may not include coupler 224 and the local oscillator signal 228 and the target signal 222 may optically mix at photodetector 226, as previously described.

Figure 8:
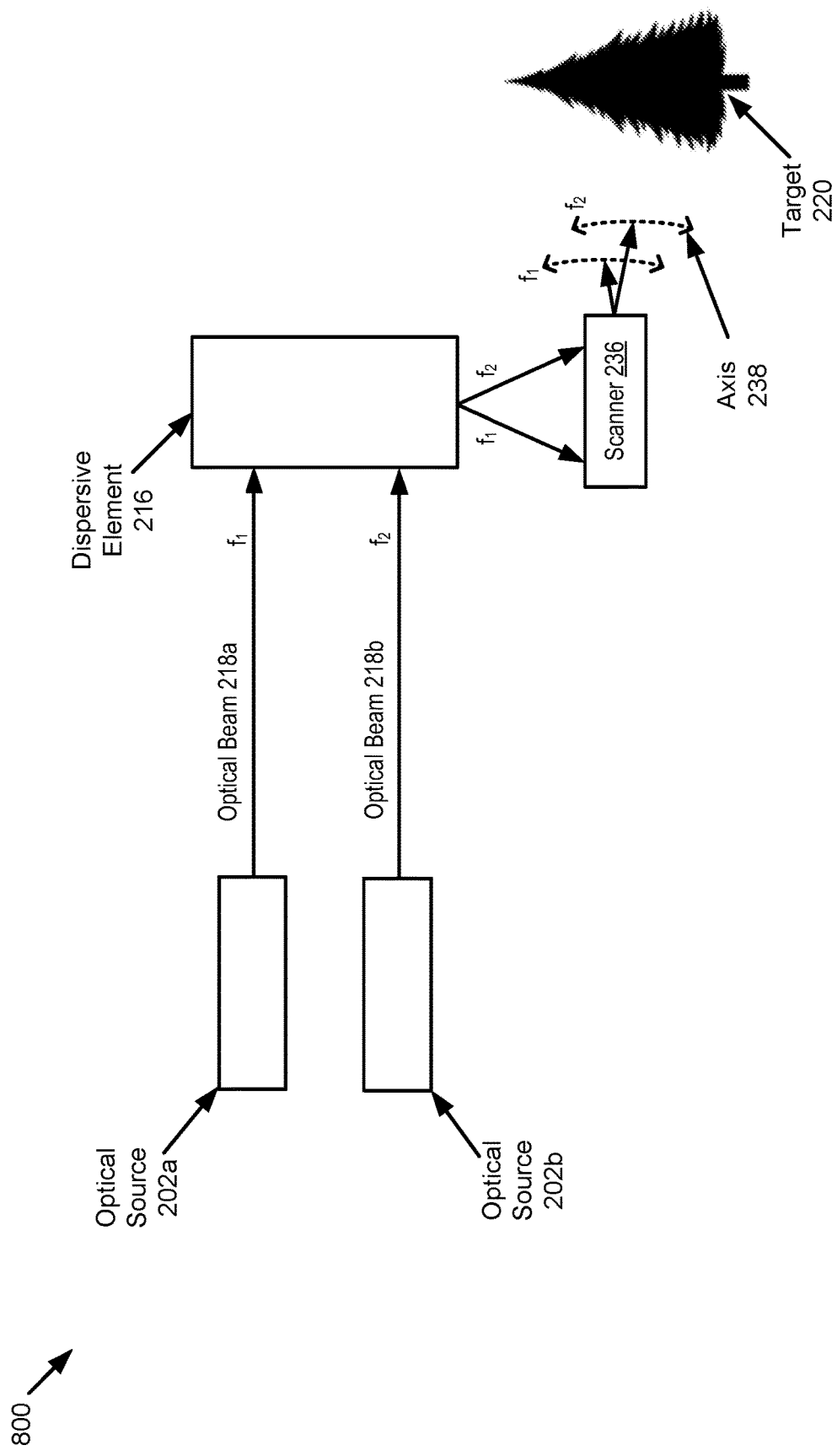
FIG. 8 illustrates aspects of a LIDAR system having multiple optical sources in accordance with an embodiment of the present disclosure.

FIG. 8 illustrates aspects of a LIDAR system 800 having multiple optical sources in accordance with an embodiment of the present disclosure. The components of LIDAR system 800 may be similar to the components of LIDAR system 200. For clarity, some of the components (e.g., free-space optics, optical devices, reference arm circuit, etc.) of LIDAR system 800 have been omitted from FIG. 8. Rather than utilizing a single optical source, LIDAR system 800 utilizes multiple optical sources (e.g., optical source 202a and optical source 202b) that each generate an optical beam having a different frequency. For example, optical source 202a may generate an optical beam 218a having a first frequency ($f_1$) and optical source 202b may generate an optical beam 218b having a second frequency ($f_2$). Optical beam 218a and optical beam 218b may be provided to dispersive element 216. The dispersive element 216 may deflect optical beams 218a and 218b at different angles based on their frequencies. Although illustrated as having two optical sources, in embodiments LIDAR system 800 may include any number of optical sources generating optical beams having different frequencies.

FIG. 9 depicts a flow diagram of a method 900 for solid state spectral scanning with a LIDAR system in accordance with implementations of the present disclosure. In embodiments, various portions of method 900 may be performed by LIDAR systems 100, 200, 500, 600, 700 and/or 800 of FIGS. 1, 2, 5, 6, 7 and 8, respectively.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

At block 902, an optical source of the LIDAR system generates a first optical beam having a first frequency. The optical source of the LIDAR system may generate the first optical beam having the first frequency at a first time.

At block 904, the optical source generates a second optical beam having a second frequency. The optical source of the LIDAR system may generate the second optical beam having the second frequency at a second time that is later than the first time. In some embodiments, multiple optical sources may generate the optical beams. For example, a first optical source may generate the first optical beam at block 902 and a second optical source may generate the second optical beam.

In embodiments using multiple optical sources to generate optical beams of different frequencies, the optical beams may be generated at different times or at a same or substantially similar time. Generating the optical beams at a same or substantially similar time may result in a significant reduction in scan time, further improving the performance of the LIDAR system.

In some embodiments, the multiple optical sources may be tunable optical sources that may each generate optical beams centered around a range of frequencies, as previously described. A field of view may be divided into multiple parts and each of the tunable optical sources may generate optical beams at a same or substantially similar time to each scan a different part of the field of view in parallel with one another, resulting in a reduction in scan time and improving the performance of the LIDAR system.

At block 906, the LIDAR system generates a first local oscillator (LO) signal using the first optical beam and a second local oscillator signal using the second optical beam. In some embodiments, the first LO signal and the second LO signal may be generated by a coupler of the LIDAR system splitting a portion of reference signals associated with the first optical beam and second optical beam to generate the first LO signal and second LO signal, as previously described at FIG. 2. In other embodiments, the first LO signal and second LO signal may be generated by reflecting a portion of the first optical beam and the second optical beam, as previously described at FIG. 5.

At block 908, the first optical beam having the first frequency and the second optical beam having the second frequency are provided to a dispersive element. The dispersive element deflects the first optical beam having the first frequency at a first angle and the second optical beam having the second frequency at a second angle, as previously described. The second optical beam may be provided to the dispersive element at a later time than the first optical beam.

At block 910, the LIDAR system receives a first target signal associated with the first optical beam and a second target signal associated with the second optical beam. The first target signal and second target signal may correspond to a reflection of the first optical beam and the second optical beam, respectively, by an object.

At block 912, the first target signal is combined with the first LO signal to generate a first combined signal and the second target signal is combined with the second LO signal to generate a second combined signal.

At block 914, the first combined signal and the second combined signal are provided to a photodetector for subsequent analysis.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) apparatus, comprising:
    an optical source to emit a first optical beam having a first frequency and a second optical beam having a second frequency, wherein the first optical beam comprises a first linear chirp that is tuned around the first frequency and the second optical beam comprises a second linear chirp that is tuned around the second frequency; and
    a dispersive element to deflect the first optical beam having the first frequency at a first angle and the second optical beam having the second frequency at a second angle.

2. The LIDAR apparatus of claim 1, wherein the dispersive element deflects the first optical beam and the second optical beam along a first axis, the LIDAR apparatus further comprising:
    a scanner to deflect the first optical beam and the second optical beam along a second axis that is orthogonal to the first axis.

3. The LIDAR apparatus of claim 1, further comprising:
a polarization beam splitter (PBS) to pass a first polarization state of light through the PBS in a first direction and reflect a second polarization state of light in a second direction different than the first direction.

4. The LIDAR apparatus of claim 1, further comprising:
an optical circulator to direct the first optical beam and the second optical beam from the optical source in a first direction and direct a first target signal associated with the first optical beam and a second target signal associated with the second optical beam in a second direction.

5. The LIDAR apparatus of claim 1, further comprising a polarization wave plate to transform a polarization state of the first optical beam and the second optical beam.

6. The LIDAR apparatus of claim 5, wherein the polarization wave plate comprises one of a quarter-wave plate or a half-wave plate.

7. The LIDAR apparatus of claim 5, wherein the polarization wave plate further comprises a reflector or a coating to return a portion of the first optical beam as a first local oscillator signal and a portion of the second optical beam as a second local oscillator signal.

8. The LIDAR apparatus of claim 1, further comprising:
an optical isolator comprising a tap to provide a portion of the first optical beam as a first reference signal and a portion of the second optical beam as a second reference signal to a reference arm circuit.

9. The LIDAR apparatus of claim 8, wherein the reference arm circuit comprises:
an interferometer to receive the first reference signal and the second reference signal; and
a photodetector to receive the first reference signal and the second reference signal from the interferometer.

10. The LIDAR apparatus of claim 9, wherein the reference arm circuit further comprises:
a coupler to split a portion of the first reference signal to generate a first local oscillator signal and a portion of the second reference signal to generate a second local oscillator signal.

11. The LIDAR apparatus of claim 1, further comprising:
a photodetector to receive a first combined signal comprising a first target signal and first local oscillator signal associated with the first optical beam and a second combined signal comprising a second target signal and second local oscillator signal associated with the second optical beam.

12. The LIDAR apparatus of claim 11, wherein the optical source and the photodetector are positioned on a photonic chip.

13. A method comprising:
generating, by an optical source of a light detection and ranging (LIDAR) system, a first optical beam having a first frequency and a second optical beam having a second frequency, wherein the first optical beam comprises a first linear chirp that is tuned around the first frequency and the second optical beam comprises a second linear chirp that is tuned around the second frequency; and
providing, to a dispersive element, the first optical beam having the first frequency and the second optical beam having the second frequency, wherein the dispersive element deflects the first optical beam having the first frequency at a first angle and the second optical beam having the second frequency at a second angle.

14. The method of claim 13, wherein the dispersive element deflects the first optical beam and the second optical beam along a first axis, the method further comprising:
providing, to a scanner, the first optical beam and the second optical beam, wherein the scanner deflects the first optical beam and the second optical beam along a second axis that is orthogonal to the first axis.

15. The method of claim 13, further comprising:
splitting, by a first coupler, a portion of the first optical beam to generate a first local oscillator signal and a portion of the second optical beam to generate a second local oscillator signal;
receiving a first target signal associated with the first optical beam and a second target signal associated with the second optical beam;
combining, by a second coupler, the first target signal with the first local oscillator signal to generate a first combined signal, and the second target signal with the second local oscillator signal to generate a second combined signal; and
providing the first combined signal and the second combined signal to a photodetector.

16. The method of claim 13, further comprising:
reflecting, by a reflector or a coating of a polarization wave plate, a portion of the first optical beam to generate a first local oscillator signal and the second optical beam to generate a second local oscillator signal;
receiving a first target signal associated with the first optical beam and a second target signal associated with the second optical beam;
combining, by a coupler, the first target signal with the first local oscillator signal to generate a first combined signal and the second target signal with the second local oscillator signal to generate a second combined signal; and
providing the first combined signal and the second combined signal to a photodetector.

17. The method of claim 13, further comprising:
providing a portion of the first optical beam and the second optical beam as a reference signal to a reference arm circuit.

18. The method of claim 13, further comprising:
generating, by a plurality of optical sources of the LIDAR system, a plurality of optical beams, each of the plurality of optical beams having a different corresponding frequency.

* * * * *